United States Patent [19]

Huang

[11] Patent Number: 6,062,782
[45] Date of Patent: May 16, 2000

[54] CROSSBAR DEVICE FOR LIMITING CARGOES FROM FALLING

[76] Inventor: Han-Ching Huang, P.O. Box 63-247, Taichung, Taiwan

[21] Appl. No.: 09/316,747

[22] Filed: May 21, 1999

[51] Int. Cl.[7] ...................................................... B60P 7/15
[52] U.S. Cl. ........................................... 410/151; 410/143
[58] Field of Search .................................... 410/151, 145, 410/143; 211/105.3; 254/12, 95, 109; 248/354.1, 354.6, 354.7, 200.1; 74/167, 169, 141.5

[56] References Cited

U.S. PATENT DOCUMENTS

| | | | |
|---|---|---|---|
| 923,463 | 6/1909 | Taylor | 410/151 |
| 5,094,576 | 3/1992 | Fredelius | 410/151 |
| 5,769,580 | 6/1998 | Purvis | 410/151 |
| 5,813,647 | 9/1998 | Chen | 410/151 X |
| 5,833,414 | 11/1998 | Feldman et al. | 410/151 |
| 5,890,856 | 4/1999 | Huang | 410/151 |
| 5,947,666 | 9/1999 | Huang | 410/151 |

FOREIGN PATENT DOCUMENTS 616129   3/1961   Canada ..................................... 254/12

*Primary Examiner*—Stephen T. Gordon
*Attorney, Agent, or Firm*—Alan Kamrath; Oppenheimer Wolff & Donnelly LLP

[57] ABSTRACT

A crossbar device includes an outer tube with an inner tube retractably received in the outer tube. An adjusting device is connected to the outer tube and has two pawl members pivotally connected therein which has a connecting member connected therebetween. The connecting member is actuated by an actuating member which is movably connected to the adjusting device. The adjusting device has a handle to which the two pawl members are pivotally connected thereto and the two pawl members are disengagably engaged with the inner tube. A pin is connected to the handle and located below one of the pawl members so that when pulling the actuating member to release the connecting member, and pushing the handle, the pawl members are pivoted and disengaged from the inner tube so that the inner tube is freely moved corresponding to the outer tube. The pin prevents the lower pawl member from engaging with the inner tube by gravity.

2 Claims, 6 Drawing Sheets

CROSSBAR DEVICE FOR LIMITING CARGOES FROM FALLING

FIELD OF THE INVENTION

The present invention relates to a retractable crossbar device for limiting cargoes in a truck trailer from falling, and more particularly, to the crossbar device which is easily and rapidly adjusted its length.

BACKGROUND OF THE INVENTION

A conventional crossbar device for limiting cargoes in a truck trailer from falling known to applicant is disclosed in applicant's former U.S. Pat. No. 5,890,856 having the title of "CROSSBAR DEVICE FOR LIMITING CARGOES FROM FALLING". The '856 patent involves a pushing member located between the two plates of the handle wherein the pushing member has one end thereof engaged with the second pawl member and the other end of the pushing member is connected to the two plates of the handle. Each end of the pushing member has a pin which is movably inserted in one of two respective slots in the two plates. Therefore, when the pushing member is pushed, the second pawl member, the two pawl members are disengaged from the toothed surface of the inner tube. Although the device is welcomed and improves the shortcomings of the conventional devices, the pushing member is not so table after being operated repeatedly for a period of time.

The present invention provides an improved crossbar device wherein a stop pin is located below the first pawl member so that when pushing the handle downwardly, the two pawl member will not drop to engage with the toothed surface of the inner tube so that the in inner tube can be rapidly moved corresponding to the outer tube without interruption by the pawl members.

SUMMARY OF THE INVENTION

In accordance with one aspect of the present invention, there is provided a crossbar device comprising an outer tube with a first contacting member fixedly connected to a first end of the outer tube, an inner tube having a first end thereof retractably received in the outer tube and a second contacting member fixedly connected to a second end of the inner tube. An adjusting means is connected to the second end of the outer tube and the inner tube has a toothed surface defined in an upper surface thereof.

The adjusting means includes a handle which two plates extend, each of which has a first hole, a second hole and a third hole defined therethrough. A first pawl member and a second pawl member are respectively and pivotally connected between the two plates by a first pin and a second pin extending through the first holes and the second holes. Each of the first pawl member and the second pawl member has a transverse bar extending laterally from a lower end thereof with a connecting member connected therebetween. A third pin extends through the third holes of the handle and located below the first pawl member.

A cover member is connected to the second end of the outer tube and has an actuating member movably inserted therein so as to press the connecting member to lower the respective lower ends of the first pawl member and the second pawl member to engage with the toothed surface.

It is an object of the present invention to provide a crossbar device which has a pin located below the first pawl member so as to prevent the first pawl member from disengaging with the inner tube by gravity when the inner tube is freely moved pushing member, an inner tube is rapidly moved corresponding to an outer tube by.

Further objects, advantages, and features of the present invention will become apparent from the following detailed description with appropriate reference to the accompanying drawings.

DETAILED DESCRIPTION OF THE PREFERRED EMBODIMENT

Figure 1:
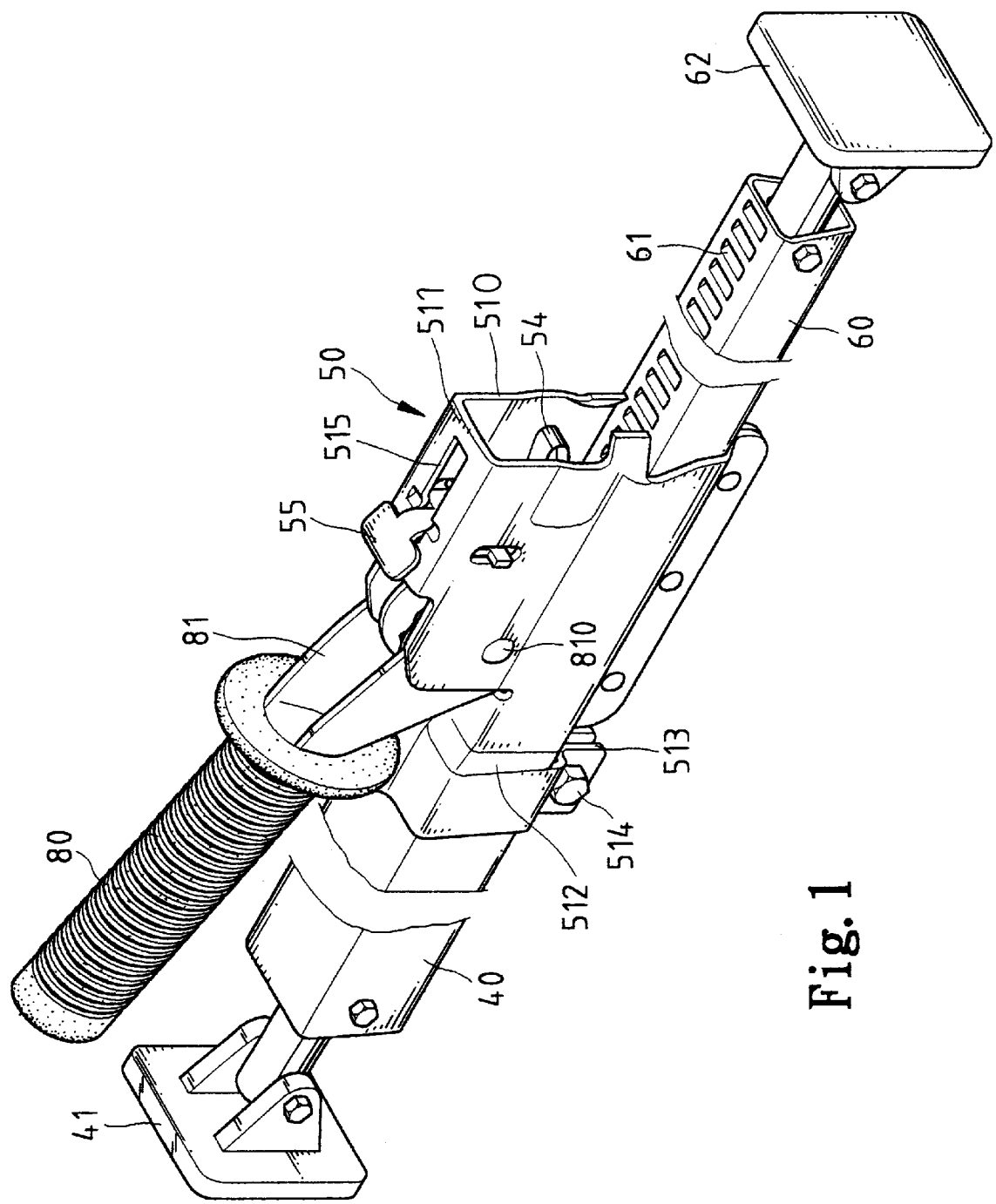
FIG. 1 is a perspective view of a crossbar device in accordance with the present invention.
Figure 2:
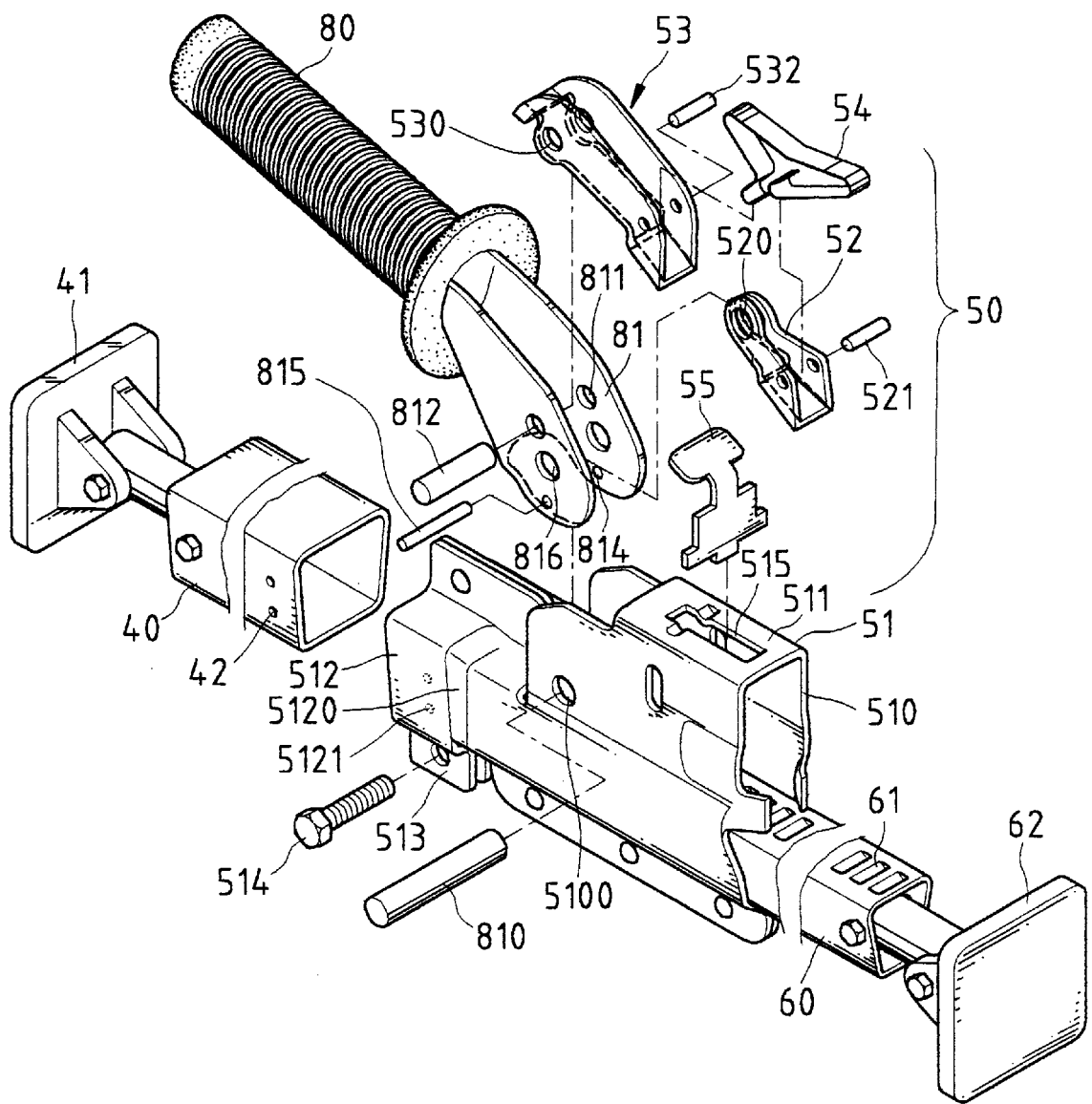
FIG. 2 is an exploded view of the crossbar device in accordance with the present invention.
Figure 3:
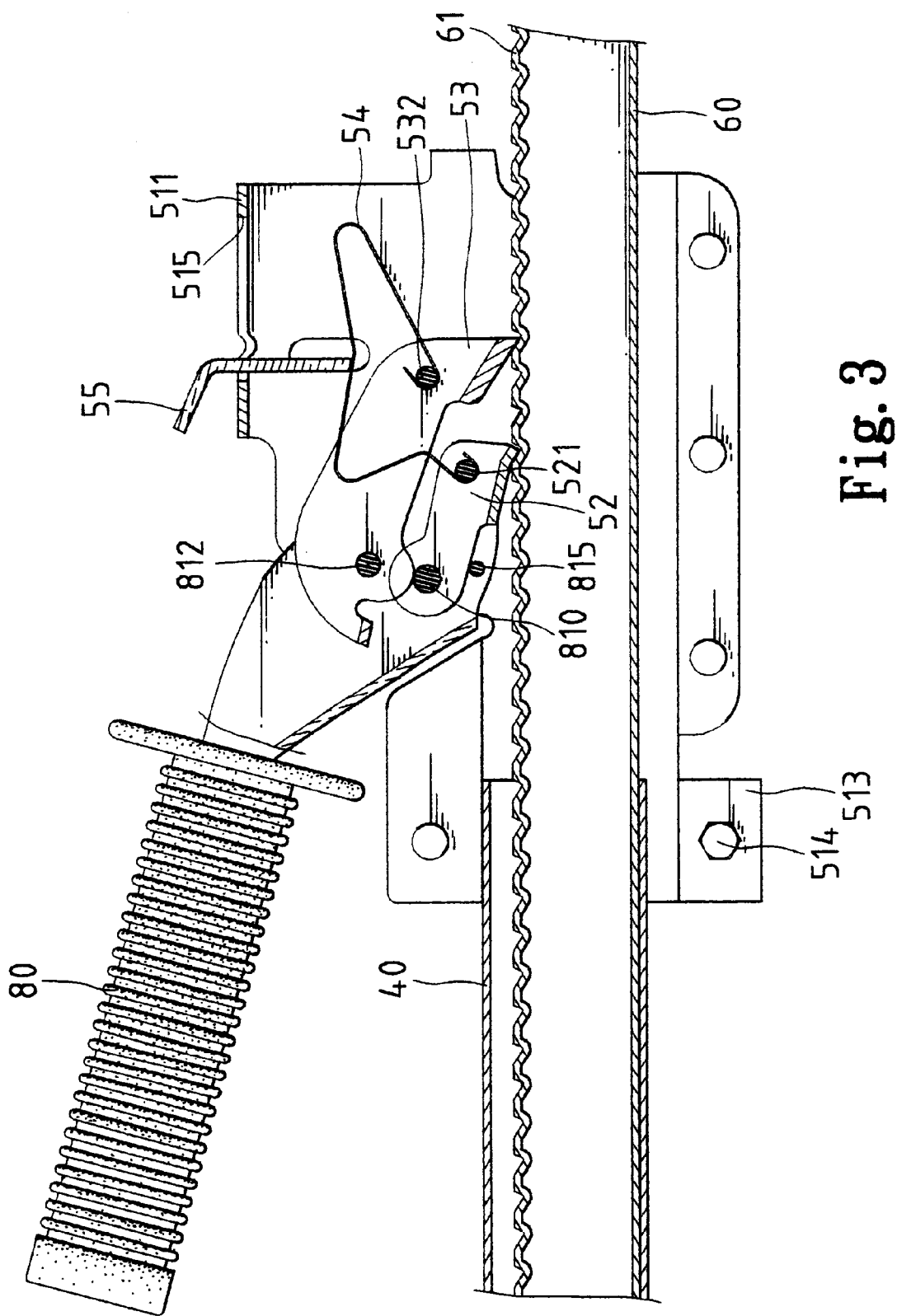
FIG. 3 is a side elevational view, partly in section, of the crossbar device in accordance with the present invention, an inner tube of the device is positioned by pawl members of the device of the present invention.

Referring to FIGS. 1 through 3, the crossbar device in accordance with the present invention comprises an outer tube 40 with a first contacting member 41 fixedly connected to a first end of the outer tube 40, an inner tube 60 having a first end thereof retractably received in the outer tube 40 and a second contacting member 62 fixedly connected to a second end of the inner tube 60. An adjusting means 50 is disposed to the second end of the outer tube 40 with the inner tube 60 extending through the adjusting means 50. The inner tube 60 has a toothed surface 61 defined in an upper surface thereof.

The adjusting means 50 includes a cover member 51 connected to the second end of the outer tube 60, two sidewalls 510 and a top 511 connected between the two sidewalls 510. The top 511 has an aperture 515 defined therethrough so that an actuating member 55 is movably inserted therein. The cover member 51 has an enlarged head portion 512 which is connected to the two sidewalls 510 by a divergent neck 5120. The head portion 512 has two lugs 513 formed to an underside thereof and two bosses 5121 extend inwardly and laterally from an inner periphery thereof. The second end of the outer tube 40 is received in the head portion 512 and has two dents 42 defined in an outer periphery thereof so that the two bosses 5121 are received in the two dents 42 and the second end of the outer tube 40 is securely received in the head portion 512 by connecting the two lugs 513 by a bolt 514. Each of the two sidewalls 510 has an opening 5100 defined therethrough.

A handle 80 has two plates 81 extending therefrom which are inserted between the two sidewalls 510. Each of the plates 81 has a first hole 816 and a second hole 811 respectively defined therethrough. A first pawl member 52 and a second pawl member 53 are respectively and pivotally connected between the two plates 81. A first pin 810 extends through the openings 5100, the first holes 816 and the holes 520 defined through a higher end of the first pawl member 52. A second pin 812 extends through the second holes 811 and the holes 530 in a higher end of the second pawl member 53. Each of the first pawl member 52 and the second pawl member 53 has a transverse bar 521/532 extending laterally from a lower end thereof so that a flexible connecting member 54 is connected therebetween which is pressed by the actuating member 55. Therefore, when pressing the connecting member 54 by pulling the actuating member 55 will lower the respective lower ends of the second pawl member 53 and the first pawl member 52 to engage with the toothed surface 61 so as to move the inner tube 60 by the conventional way. A third pin 815 extends through two third holes 184 defined through the two plates 81 of the handle 80 and the third pin 815 is located below the first pawl member 52.

Figure 4:
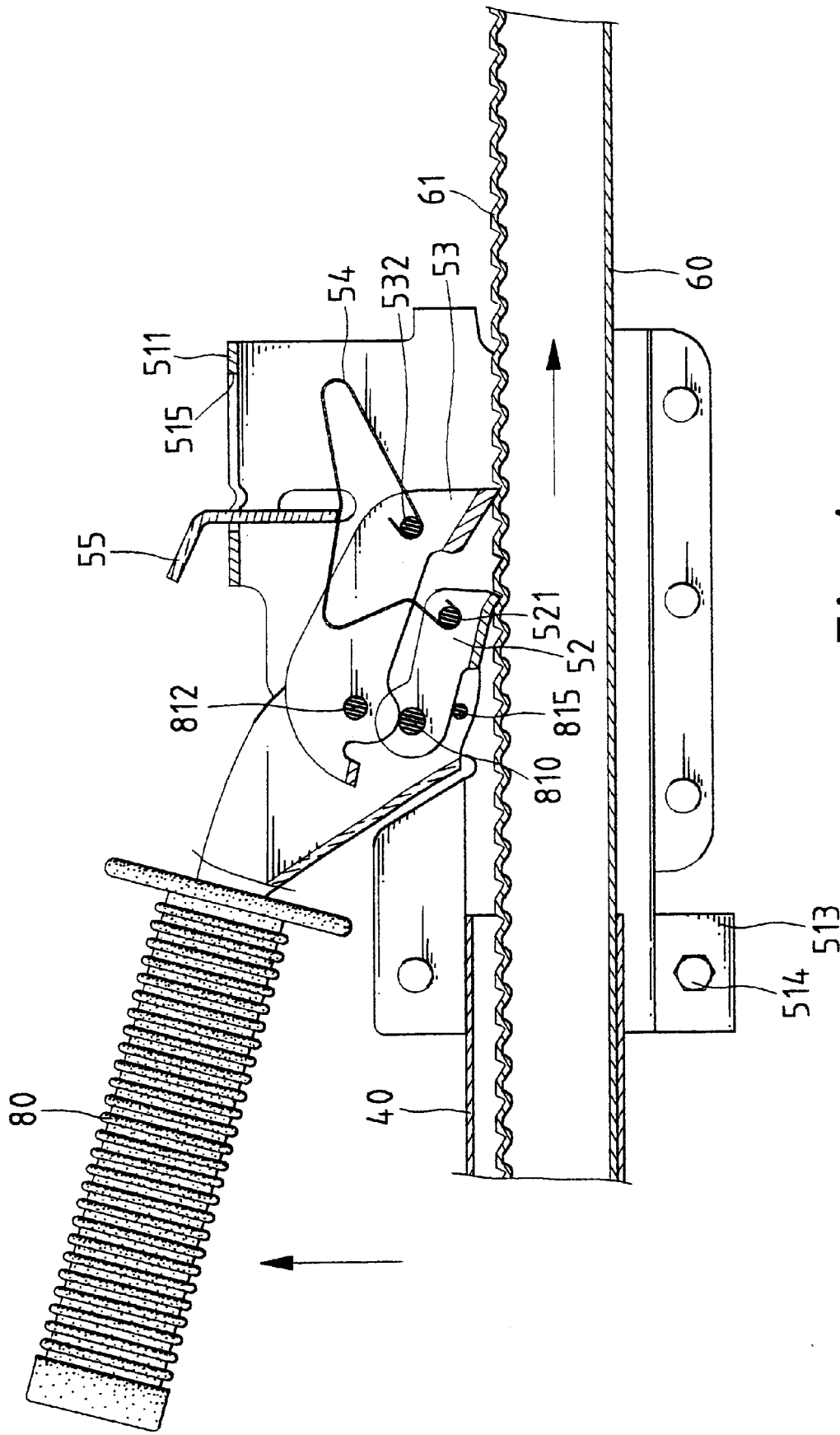
FIG. 4 is a side elevational view, partly in section, of the crossbar device in accordance with the present invention, wherein the handle is lifted to let the two pawl members push inner tube.
Figure 5:
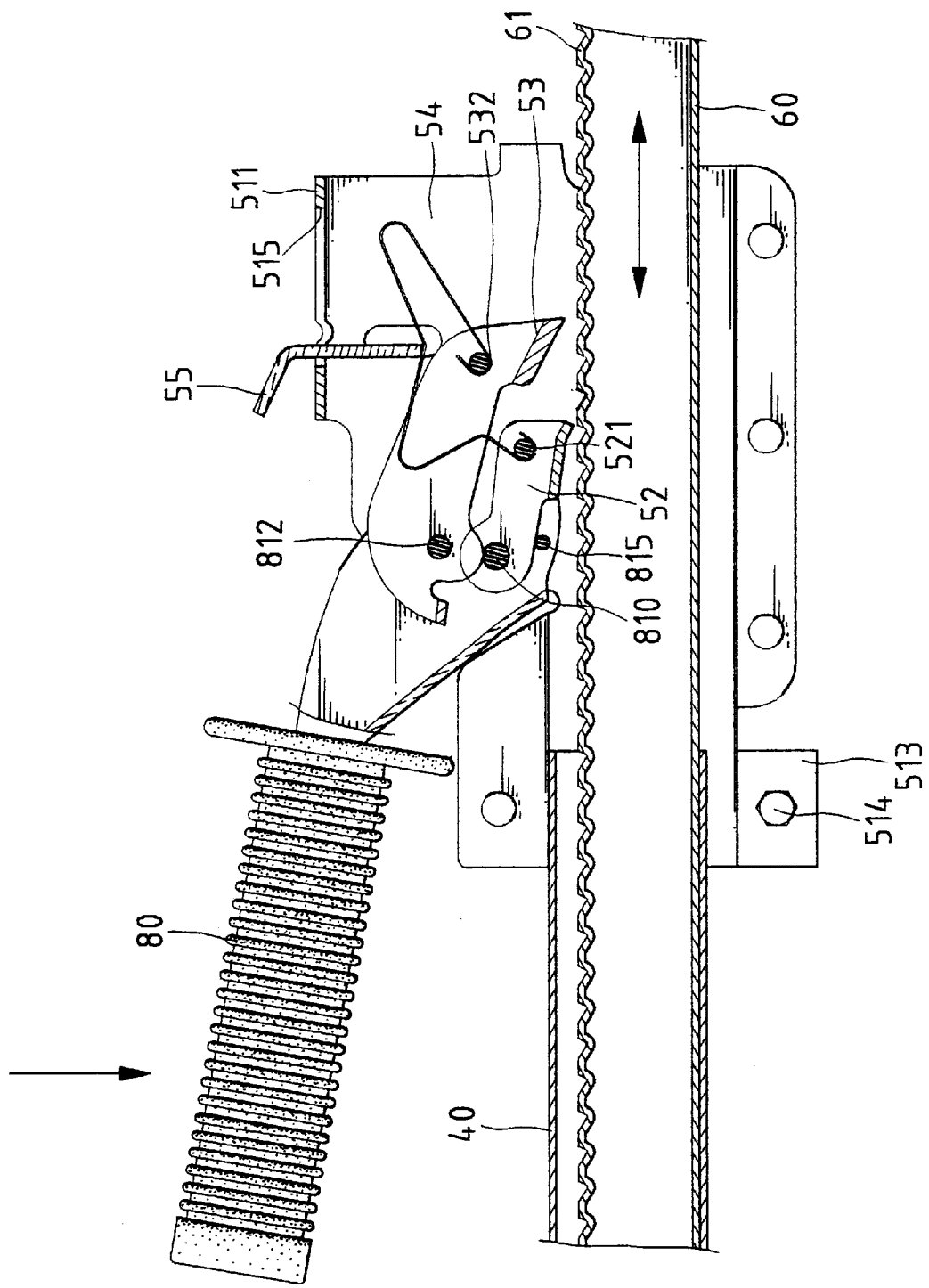
FIG. 5 is a side elevational view, partly in section, of the crossbar device in accordance with the present invention, wherein the handle is pushed to pivot the two pawl members be disengaged from the inner tube.

When repeatedly lifting and pushing the handle 80 as shown in FIGS. 4 and 5, the first pawl member 52 and the second pawl member 53 both are engaged with the toothed surface 61 of the inner tube 60 when pushing the handle 80 downwardly and the inner tube 60 is moved away from the handle 80 when lifting the handle 80 so adjust the length of the device.

Figure 6:
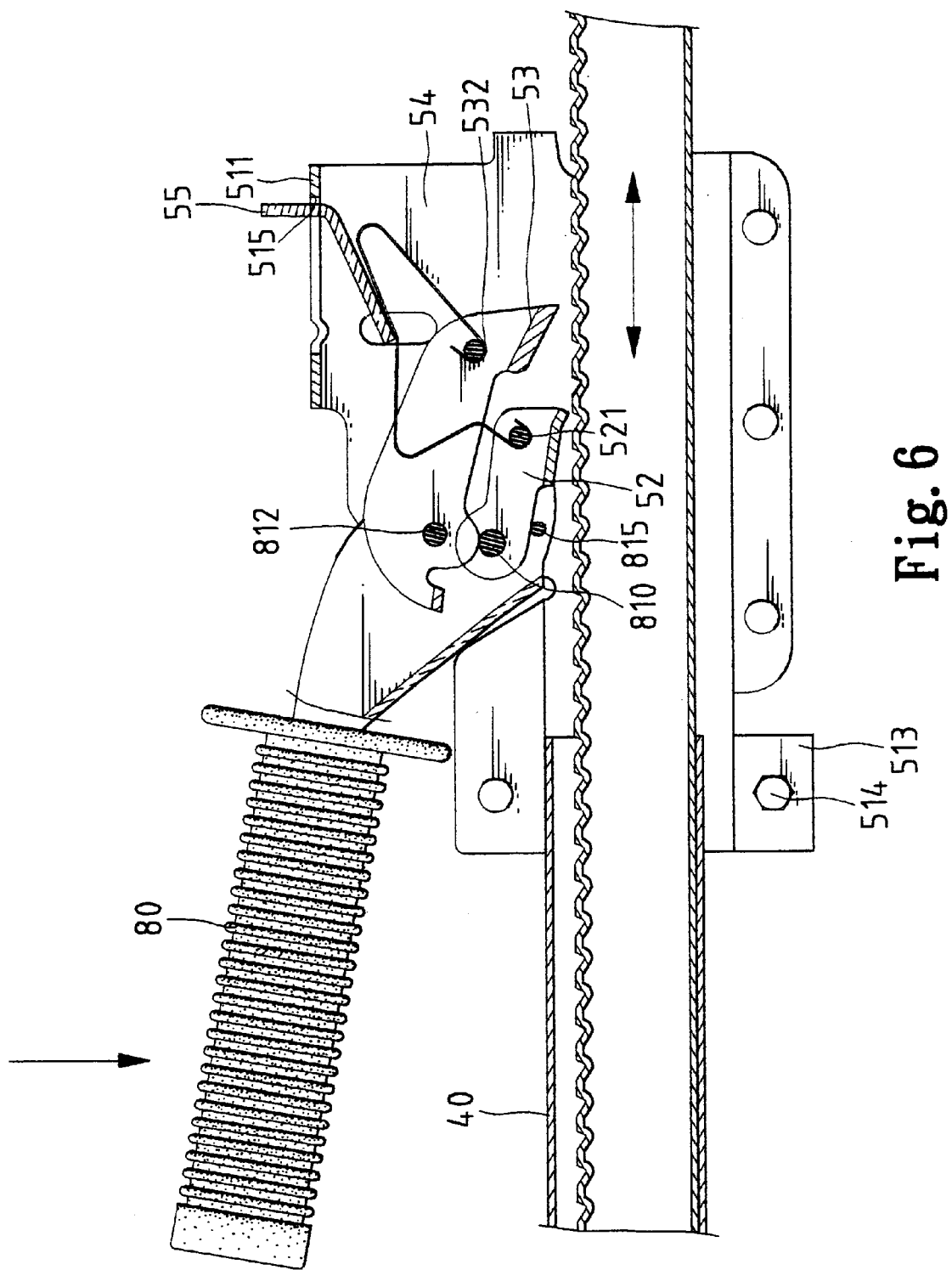
FIG. 6 is a side elevational view, partly in section, of the crossbar device in accordance with the present invention, wherein the actuating member is pulled away from the handle and the handle is pushed to let the two pawl members be disengaged from the inner tube.

Referring to FIG. 6, if the user wants to rapidly move the inner tube 60, the actuating member 55 is pulled away from the handle 80 to release the connecting member 54 and the handle 80 is pushed, the first pawl member 52 and the second pawl member 53 are disengaged from the toothed surface 61 of the inner tube 60 so that the inner tube 60 can be freely moved. The third pin 815 effectively prevents the first pawl member 52 from re-engaged with the toothed surface 61 of the inner tube 60.

The invention is not limited to the above embodiment but various modification thereof may be made. It will be understood by those skilled in the art that various changes in form and detail may made without departing from the scope and spirit of the present invention.

What is claimed is:

1. A crossbar device comprising:

an outer tube with a first contacting member fixedly connected to a first end of said outer tube, an inner tube having a first end thereof retractably received in said outer tube;

an adjusting means connected to a second end of said outer tube and said inner tube extending through said adjusting means, a second contacting member fixedly connected to a second end of said inner tube, said inner tube having a toothed surface, said adjusting means including a handle from which two plates extend and each of said plates having a first hole, a second hole and a third hole respectively defined therethrough, a first pawl member and a second pawl member respectively and pivotally connected between said two plates by respectively extending a first pin and a second pin through said first holes and said second holes, each of said first pawl member and said second pawl member having a transverse bar extending laterally from a lower end thereof, a third pin extending through said two third holes and located below said first pawl member;

a connecting member connected between said two transverse bars, and a cover member connected to said second end of said outer tube and having an actuating member movably inserted therein, said actuating member pressing said connecting member to lower said respective lower ends of said first pawl member and said second pawl member to engage with said toothed surface.

2. The crossbar device as claimed in claim 1, wherein said cover member has an enlarged head portion which has two lugs formed to an underside thereof and two bosses extend inwardly and laterally from an inner periphery thereof, said second end of said outer tube having two dents defined in an outer periphery thereof so that said two bosses are received in said two dents and said second end of said outer tube is securely received in said head portion by connecting said two lugs by a bolt.

\* \* \* \* \*